UNITED STATES PATENT OFFICE.

HENRY J. DETWILLER, OF BETHLEHEM, ASSIGNOR TO HERMAN A. DOSTER AND CHARLES W. ROEPPER, OF SAME PLACE, AND WILLIAM J. TAYLOR, OF CHESTER, PENNSYLVANIA.

IMPROVEMENT IN EXPLOSIVE COMPOUNDS.

Specification forming part of Letters Patent No. 170,066, dated November 16, 1875; application filed August 28, 1875.

*To all whom it may concern:*

Be it known that I, HENRY J. DETWILLER, of Bethlehem, in the county of Northampton and State of Pennsylvania, have invented certain new and useful Improvements in Detonating Compounds; and I do hereby declare that the following is a full, clear, and exact description thereof, which will enable others skilled in the art to which it pertains to make and use the same, reference being had to the accompanying drawings, and to the letters of reference marked thereon, which form a part of this specification.

I have produced a new detonating compound specially applicable for use with railway-torpedoes, but equally serviceable for other purposes, in which percussion or concussion is employed as the exploding means.

My object is to produce a compound that will be free from spontaneous combustion, and that will preserve its effective quality for an indefinite length of time, while being cheaper than any compound of the kind known to me.

The compound consists of ground bark, five parts; chlorate of potassa, ten parts; and red or amorphous phosphorus, one part. These are compounded with water or alcohol to give it a liquid form, which lessens the danger in handling, and facilitates its use by allowing it to be poured. It should only be mixed in quantities suitable for immediate use when alcohol is employed, as it evaporates rapidly and leaves the compound dry, which is an advantage in filling torpedoes for railroads.

The chlorate of potassa and the amorphous phosphorus constitute the explosive element when combined and brought under concussion, while the ground bark gives body to the compound and lessens the quantity of the more expensive ingredients, and very materially cheapens the compound.

The chlorate of potassa, when used with amorphous phosphorus, will not combine or coalesce as one, but will remain separate, and the compound being free from sulphur, there is, therefore, no liability for spontaneous combustion. In this connection, also, the ground bark forms a safe element, and the mixture can be subjected to considerable heat without danger of explosion. In this particular my compound has very great advantage over other detonating compounds containing sulphur.

A small proportion of the effective components will make a very loud report; and, indeed, they are only used in small proportions, especially the amorphous phosphorus, which is expensive, while the ground bark, being light and very cheap, forms about two-thirds of the bulk of the material, and does not, in the least degree, interfere with the loudness of the sound or the instantaneous combination of the chemicals when brought into action, as it readily consumes with little flame.

Any lignite will answer, if ground to the proper fineness, but I prefer the native lignites of ground bark or sawdust.

When the compound is used it is allowed to dry, and is then sealed up in any suitable way to suit the purpose for which it is intended.

The proportions stated I have found best adapted for use in railroad-torpedoes; but these proportions may be varied, if deemed necessary, either to render the detonating compound more sensitive, safe, or louder.

I am aware that chlorate of potash, charcoal, and red phosphorus have been employed as a fulminating compound; but the advantages of ground bark or sawdust are that they cost only a trifle, and that the latter need only be sieved to get out the finer quality. With charcoal there is a much larger outlay for material, besides the expense of reducing it to a fine powder, the cost being about twelve cents a pound. Ground bark costs only four cents a pound, while sawdust costs nothing to grind and but little to sieve it. Ground bark and sawdust are anti-frictional substances, while charcoal is frictional to some extent. Charcoal, mixed with chlorate of potassa, will explode by rubbing it in a mortar, while ground bark or sawdust and chlorate of potassa will not, and in this respect is more safe. Charcoal is carbon deprived, by charring, of other constituents, while I use native ligneous substances free from artificially-produced carbon.

I claim—

The detonating compound consisting of ground bark or sawdust, chlorate of potassa, and amorphous phosphorus, substantially in the proportions herein set forth.

In testimony that I claim the foregoing I have affixed my signature in presence of two witnesses.

HENRY J. DETWILLER.

Witnesses:
A. E. H. JOHNSON,
J. W. HAMILTON JOHNSON.